United States Patent [19]
Fink et al.

[11] Patent Number: 5,390,700
[45] Date of Patent: Feb. 21, 1995

[54] AUTOMATIC VALVE

[75] Inventors: Günter Fink, Schongau; Helmut Schröcker, Schwabbruck, both of Germany

[73] Assignee: Hoerbiger Ventilwerke Aktiengesellschaft, Vienna, Austria

[21] Appl. No.: 171,160

[22] Filed: Dec. 22, 1993

[30] Foreign Application Priority Data

Dec. 23, 1992 [AT] Austria ................................ 2562/92

[51] Int. Cl.$^6$ ............................................. F16K 15/14
[52] U.S. Cl. .............................. 137/512.15; 137/516.13; 417/570
[58] Field of Search ...................... 137/512.15, 516.13, 137/516.15; 417/569, 570, 571

[56] References Cited

U.S. PATENT DOCUMENTS

| | | | |
|---|---|---|---|
| 1,279,920 | 9/1918 | Sebald | 137/516.15 |
| 1,299,815 | 4/1919 | Bayles | 137/512.15 |
| 2,935,248 | 5/1960 | Gerteis | 137/512.15 X |
| 3,113,523 | 12/1963 | Woodward et al. | 417/569 X |
| 3,265,085 | 8/1966 | Koehler | 137/516.13 |
| 3,327,731 | 6/1967 | Kehler | 137/516.13 |
| 3,566,914 | 3/1971 | Koehler | 137/512.15 X |
| 3,903,921 | 9/1975 | Brookman | 137/516.13 |
| 4,164,238 | 8/1979 | Riedel | 137/512.15 |
| 4,231,394 | 11/1980 | Hrabal et al. | 137/512.15 X |
| 4,402,342 | 9/1983 | Paget | 137/512.15 |

Primary Examiner—John Rivell
Attorney, Agent, or Firm—Watson, Cole, Grindle & Watson

[57] ABSTRACT

An automatic valve for use in compressors or an otherwise non-return valve has a valve seat with passage channels which are controlled by a shutter blade (16). The shutter blade (16) includes a lock element (27) with concentric rings (19) connected together by radial cross pieces (29). The lock element (27) is guided by flexible guides (26). To enlarge the passage cross section through the valve and to improve the flow conditions, the guides (26), clamped on their outer rim, are guided radially inwardly from the clamping point with an outer cross piece (30); then pass over in the shape of an arch (31) with a relatively large radius of curvature into at least one ring section (32), which extends in the circumferential direction, and is provided with an outwardly directed bend (33), and in turn passes over in an inwardly directed arch (34) with an equally large radius of curvature into an inner cross piece (35), which adjoins the lock element (37). The radial cross pieces (30, 35, 29) of the guides (26) and the lock rings (19) are offset with respect to each other in the circumferential direction. In the opening direction of the valve space for freely swinging out the shutter blade (16) without an end stop is provided.

5 Claims, 3 Drawing Sheets

AUTOMATIC VALVE

BACKGROUND OF THE INVENTION

1. Field of the Invention

The invention relates to an automatic valve, in particular a compressor valve or non-return valve, with a valve seat which includes passage channels for the controlled medium over which a shutter blade can be moved that comprises a lock element with concentric rings connected together by means of radial cross pieces and is guided by means of flexible guides, whose one end engages with the outer rim of the lock element and whose other end is fixed in position relative to the valve seat outside the lock element.

2. The Prior Art

Valves of this design are known and usually consist of a valve seat, a catcher which is arranged at a distance from the valve seat, and moveable valve members which are arranged between the valve seat and the catcher, in particular a lock plate or shutter blade. In addition to valves with lock elements that slide along a guide surface, there exist valves with shutter blades which are guided without friction by means of flexible guides during their lifting motion. The flexible guides can be arranged either concentrically within the lock rings and engage internally at the lock element of the shutter blade or extend from the outer rim of the lock element. Their ends facing away from the lock element are fixed in position relative to the valve seat and the catcher; they can be clamped, e.g., between the valve seat and the catcher.

A valve guide of this kind is known from GB-PS 18 478 (1911). In this valve guide the lock element is a plate whose concentric rings are connected together by means of cross pieces which are offset in the circumferential direction. The plate is guided without friction by means of the flexible, outermost plate ring, which is bent up in the direction of the catcher and whose outer rim rests against the catcher. The width of this elastic guide ring is uneven. In the region of the cross pieces attached to the outermost plate ring, the guide ring is wider yet narrow at a distance thereof in order to increase its flexibility. Therefore, the plate can fracture in the region of the narrower ring sections and also in the region of the curvatures, having a relatively small radius, in the region of the cross pieces.

When the valve is open, the rings of the lock plate rest in a plane on the catcher, upon which they impinge relatively hard. The controlled medium, coming from the valve seat, impinges virtually vertically on the lock rings and is deflected twice at right angles before it leaves the passage slots of the catcher. The passage cross section of the valve depends on the size of the slots in the lock plate. On the whole, the result of the prevailing flow conditions is the formation of turbulence and back pressure phenomena which can cause, in addition to the limited passage cross section, a relatively high passage resistance for the medium flowing through the valve.

Another valve design is known from DE-A1-35 07 831 wherein the lock member consists of a spring tab. This springy tab controls the passage opening in the valve seat plate. Such valve tabs are formed by a steel spring leaf which extends usually over the entire surface of the valve seat plate. This design has no catcher and also no other end stop for the valve tab. When the valve, designed as a suction valve, is open, it projects freely into the cylindrical space. However, when the valve is open, the relatively wide sealing section also lies in the flow path of the controlled medium and thus causes back pressure, the formation of turbulence, and a two-fold deflection of the medium. Therefore, in this known valve the passage resistance is also relatively high. In addition, such valves which release only a small passage cross section for the controlled medium are suitable only for small and inexpensive compressors.

The invention is based on the problem of improving the known valves of the aforementioned design in a simple manner, so that the passage cross section for the controlled medium is enlarged and the flow conditions for the medium are improved, in order to decrease the passage resistance of the medium through the valve.

SUMMARY OF THE INVENTION

This problem is solved with the invention in that the guides, whose outer cross piece extends first radially inwardly against the outer rim of the lock element of the shutter blade or plate, passes over in the shape of an arch into at least one right segment which extends in the circumferential direction; and in front of the point of engagement at the lock element is guided first with a bend outwardly and subsequently in an arch radially inwardly with an inner cross piece to the outer rim of the lock element, whose radial cross pieces are offset with respect to the inner cross pieces of the guides that engage at the lock element and also with respect to each other in the circumferential direction, thus providing in the opening direction of the valve space to freely swing out the shutter blade without an end stop. With no end stop and with the free space to swing, this design of the shutter blade enables the shutter blade to deform without any hindrance upon opening the valve and enables the shutter blade to adapt elastically to the respective flow conditions. The result is that, despite the simple construction of the valve, the passage cross section is increased and the flow conditions are improved, thus decreasing the passage resistance of the valve for the controlled medium. In addition, the valve according to the invention is especially suitable for dry operations.

When the valve according to the invention is opened, not only the guides but also the individual ring sections of the shutter blade, including the lock element, deform, whereby the passage slots between the adjoining concentric rings spread apart almost in the shape of a diamond. Thus, the free passage cross section of the slots is enlarged. In addition, when bent apart, the ring sections of the shutter blade do not remain parallel to the sealing surface of the valve seat. Rather they deform into an inclined position relative to the flow direction of the medium, so that the medium is no longer severely deflected at right angles, but rather is guided away, without the formation of too high a back pressure and turbulence. Another advantage lies in the fact that individual passage slots between the concentric rings of the shutter blade do not lie in a plane but rather in parallel planes above or next to each other when the valve is open. The flowing medium is distributed in the interior of the valve over a large area, thus virtually preventing the medium currents from directly impinging on each other before they leave the valve through the slots. Therefore, compared to comparable known designs, the passage resistance through the valve according to the invention, is significantly decreased.

With the valve according to the invention it can happen that, as a function of the compressed medium and the operating conditions of the compressor, the guides and also the shutter blade itself are relatively severely deformed. Therefore, it is expedient to reinforce in a suitable manner primarily the guides. In another design of the invention this goal can be achieved in that the arches' diameters of curvature with which the ring sections of the guides pass over into the outer cross piece and into the inner cross piece, are greater than the average width of the ring sections of the guides. Thus, fractures in the endangered regions of curvature are avoided. In addition, the ring sections of the guides can have approximately the same width over their entire length, in particular also in the region of the arches adjoining the inner and outer cross pieces.

According to another feature of the invention, a guide design that can also cope with high stresses is achieved in that two ring sections adjoin the outer cross pieces of the guides, in that each of ring sections extends in the opposite direction and in that each of the ring sections passes over with a ring section, which starts from the adjoining outer cross piece and extends in the opposite direction, into a common inner cross piece. Thus, the lock element of the shutter blade that is disposed over the passage channels of the valve seat is held and guided, starting from each attachment point of the guides, by two guides, whereby not only the individually guides are not stressed as much, but also the parallel guide of the shutter blade is improved during the lift motion and a pressure motion is prevented. In this design the ring sections of all provided guides can be connected together into a closed ring, which deviates outwardly from the circular shape in order to achieve greater radii of curvature in the region of the inner cross pieces. The ring sections of the guides can also cover passage channels of the valve seat.

A simple and yet highly loadable design of the valve according to the invention is obtained in that the guides of the shutter blade start from two diametrically opposing outer cross pieces and end with two diametrically opposing inner cross pieces, offset by 90° in the circumferential direction with respect to the outer cross pieces. Even though only two cross pieces are provided, the shutter blade is also guided flawlessly at two diametrically opposing points, when only one inner cross piece starts from each outer cross piece.

The invention also relates to a compressor with a valve which is designed as a suction valve and is characterized in that the outer cross pieces of the guides are connected to a closed clamping ring, which is clamped between the face of the compressor cylinder and the cylinder head, whereby the shutter blade swings out freely into the compressor cylinder; the valve seat is provided in a seat plate, which is also clamped between the compressor cylinder and the cylinder head; and the passage channels for the pressure valve are arranged in the space between the clamping ring and the lock element of the shutter blade. It is a simple design of the suction valve, whose shutter blade and the guides and the clamping ring form a uniform machine part, which is clamped without any special precautionary measures merely between the face of the compressor and the valve seat plate. The passage channels for the pressure valve are provided in the region of the slots, which lie between the guides and the clamping ring or the guides and the lock element, so that they are not covered when the suction valve is closed. The pressure valves exhibit a known design adapted to the respective application.

Other details and advantages of the invention follow from the following description of an embodiment shown in the drawings.

DETAILED DESCRIPTION OF THE PREFERRED EMBODIMENT

Figure 1:
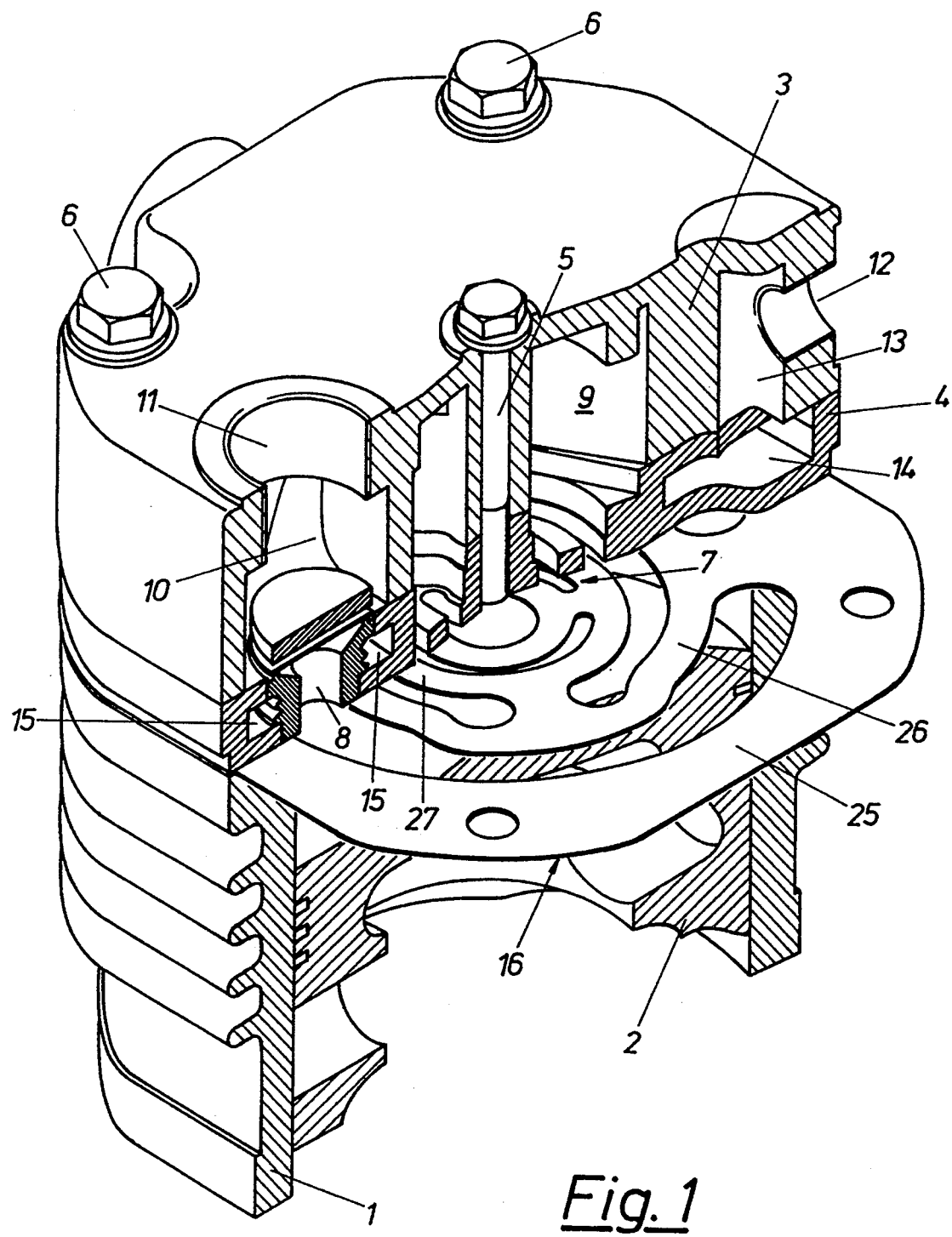
FIG. 1 is a perspective view of one part of a compressor, partially cut away in the axial direction and into which a valve assembly comprising suction valve and pressure valve is built with a suction valve according to the invention.

The compressor depicted in FIG. 1 comprises a cylinder 1 with a piston 2 and a cylinder head 3. A valve assembly with a seat plate 4, which is also attached by a tension bolt 5 to the cylinder head 3, is clamped between the cylinder 1 and the cylinder head 3. The screws 6 are attachment screws of the cylinder head 3 at the cylinder 1 and also extend through the seat plate 4.

The seat plate 4 provides a central suction valve 7 and a pressure valve 8, which comprises several individual valves and envelops concentrically the suction valve. Above the suction valve 7 the cylinder head 3 has a suction chamber 9, which is connected to an intake opening (not illustrated) and above which a threaded pressure connection 11 is guided outwardly. The cylinder head 3 and the seat plate 4 are also water cooled. A threaded cooling water connection 12 in the cylinder head 3 leads to a cooling water chamber 13 in the cylinder head 3, which is connected to a cooling water chamber 14 in the seat plate 4. The pressure valve 8 is surrounded by cooling water channels 15. The shutter blade or plate of the suction valve is denoted as 16.

Figure 2:
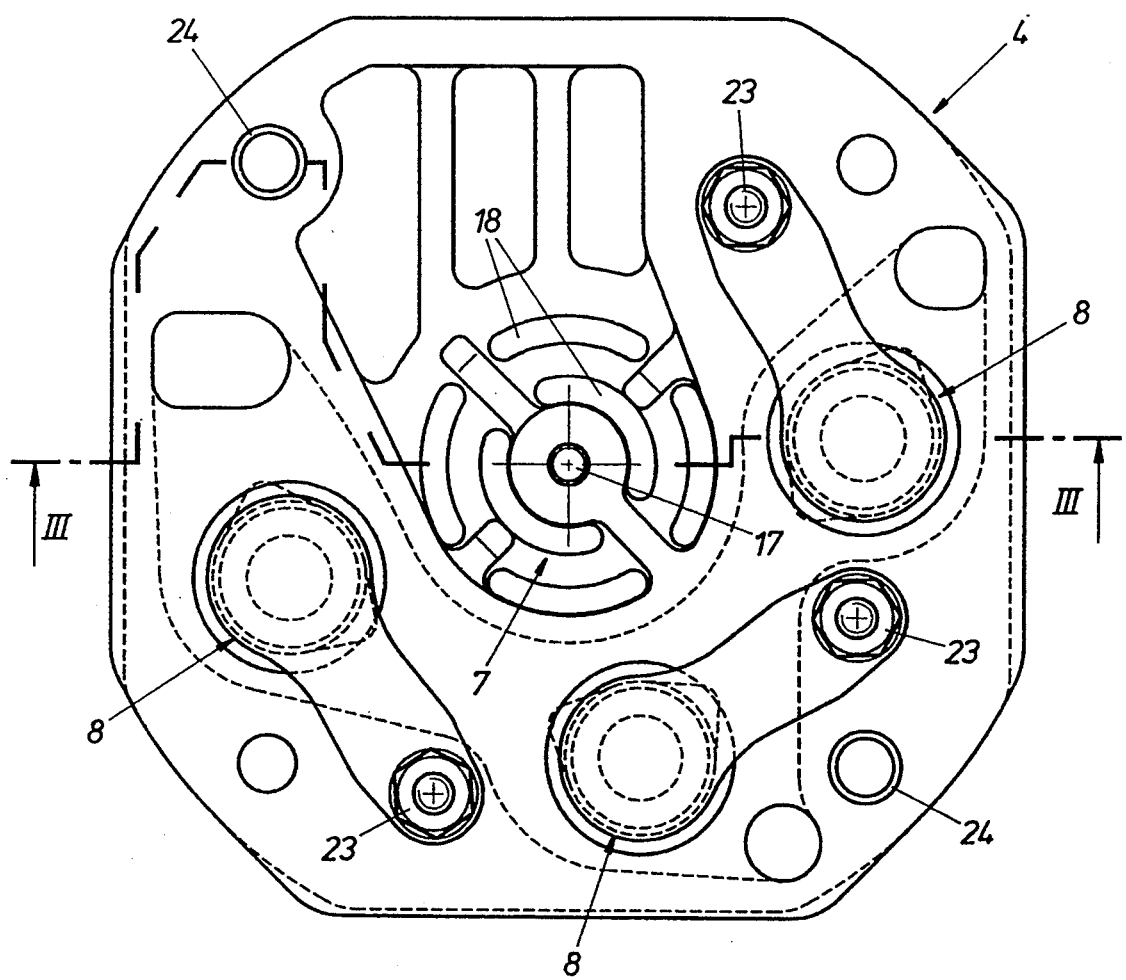
FIG. 2 is a top view of the valve assembly.
Figure 3:
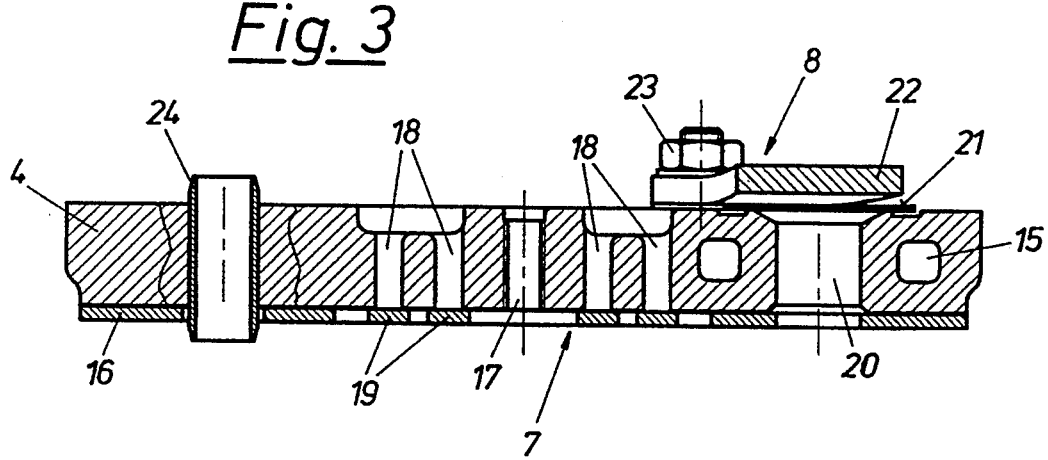
FIG. 3 is a sectional view along the line III—III of the valve assembly according to FIG. 2.

FIGS. 2 and 3 show the valve assembly with the seat plate 4. Its axis has a tapped borehole 17 to receive the tension bolt 5. The valve seat of the central suction valve 7 is provided with two concentric passage channels 18, which are arranged on two divided circles and, according to FIG. 3, are covered by lock rings 19 of the shutter blade 16. Each of the three provided pressure valves 8 has one passage channel each 20, which is controlled by means of a pressure blade 21, above which is located a pressure catcher 22. The pressure catcher 22 and the pressure blade 21 are attached with a screw 23 to the seat plate 4. Also apparent from FIG. 3 is a pipe socket 24, which penetrates the seat plate 4 and serves to center the shutter blade 16. It can be inferred from FIG. 2 that two diametrically opposing pipe sockets 24, which are also penetrated by the cylinder head screws 6, are provided.

Figure 4:
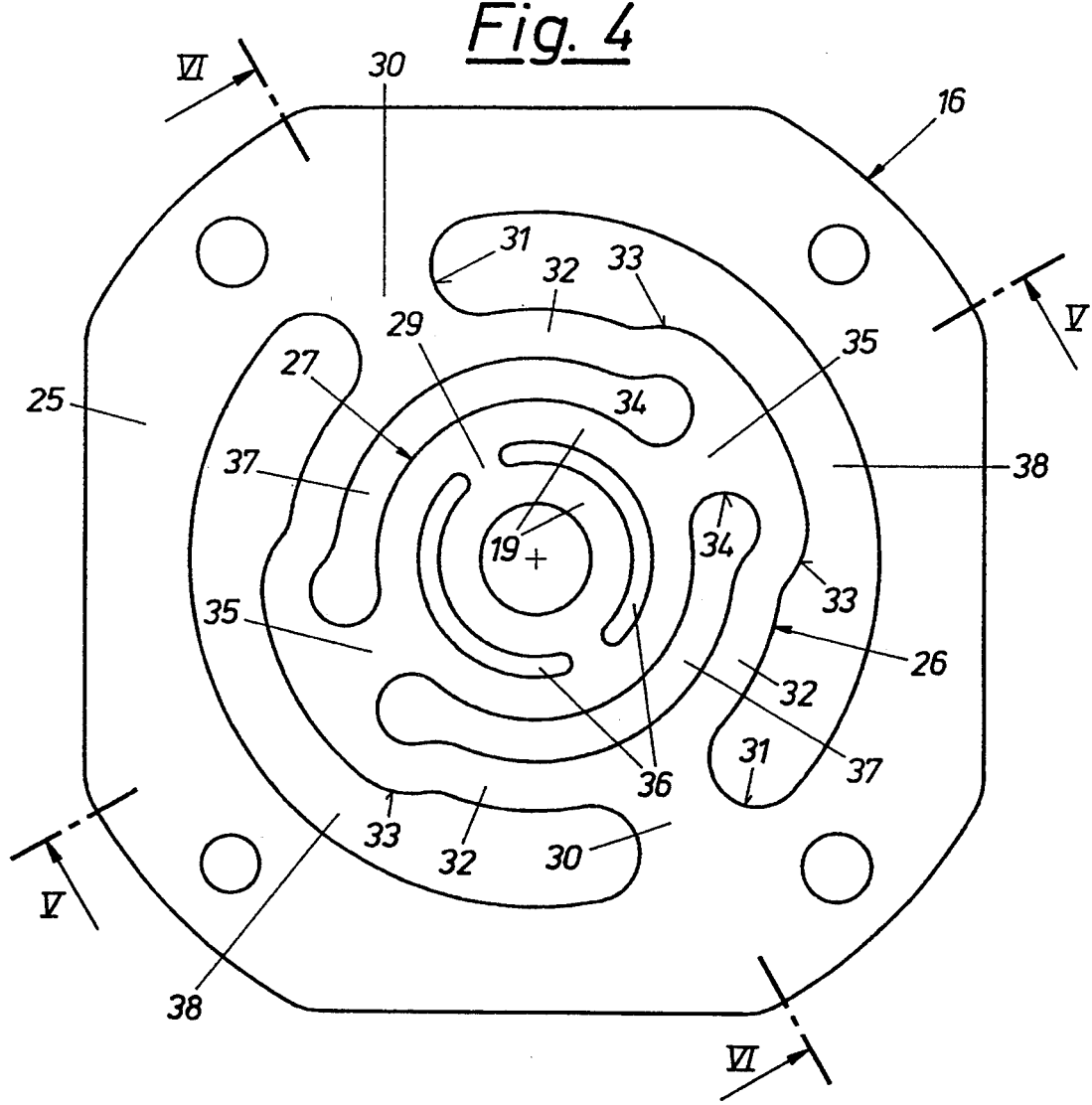
FIG. 4 is a top view of the shutter blade of the suction valve.

The shutter blade 16 shown from the top in FIG. 4 comprises a clamping ring 25, to which are attached inwardly extended guides 26 leading to a lock element 27 provided in the center of the blade. The lock element comprises two concentric lock rings 19, which are connected together by means of radial cross pieces 29. The guides 26 extend first radially inwardly with an outer cross piece 30, which branches off in the design and passes over in the shape of one arch each 31 into two ring sections 32, which extend in opposite circumferential directions. In their further course these ring sections 32 are guided subsequently outwardly with a bend 33 and then pass over with a relatively large radius of curvature into an inner cross piece 35, which adjoins the lock element 27. Between the rings 19 of the lock element 27 there are passage slots 36 and between the guides 26 and the lock element 27 there are passage slots 37, which are wider than the passage slots 36 in the embodiment. Other passage slots 38 are situated between the clamping ring 25 and the guides 26 of the shutter blade 16.

It is apparent from FIG. 4 that the curvature diameters of the arches 31 and 34, with which the ring sections 32 of the guides 26 pass over into the outer cross piece 30 and into the inner cross piece 35, are larger than the average width of the ring sections 32 of the guides 26. It can be also seen that the ring sections 32 of the guides 26 have at least approximately the same width over their entire length, in particular also in the region of the arches 34, 31 adjoining the inner and outer cross pieces 35, 30. Both measure serve to almost totally exclude the risk of fracturing the guides even when bent excessively out of the plane of the shutter blade 16.

The two ring sections 32, which start from each outer cross piece 30 in the opposite circumferential direction, lead to one other inner cross piece 35, which is offset by 90° in the circumferential direction relative to the outer cross piece 30. Two ring sections 32 extending in opposite directions in the circumferential direction are united in each inner cross piece 35. Thus, the ring sections 32 of all of the provided guides 26 are connected into a closed ring, which deviates outwardly from the circular shape in the region of the inner cross piece 35 by means of the bends 33. In the embodiment the guides 26 of the shutter blade 16 start from two diametrically opposite outer cross pieces 30 and end in two inner cross pieces 35, which are also diametrically opposite each other and are offset in the circumferential direction by 90° relative to the outer cross pieces. The clamping ring 25 connects together the two outer cross pieces 30.

Figure 5:
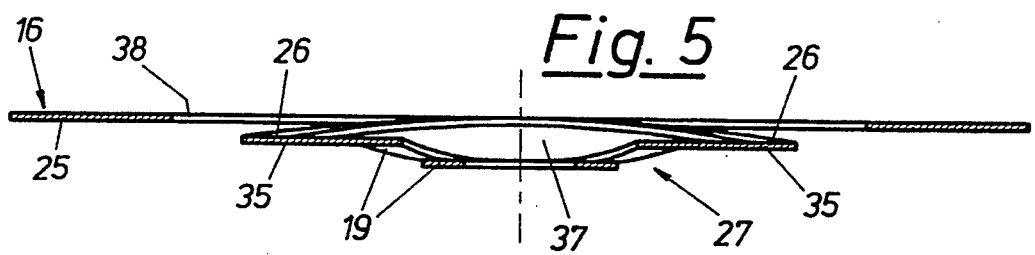
FIG. 5 is a cross sectional view of the shutter blade along the line V—V of FIG. 4.
Figure 6:
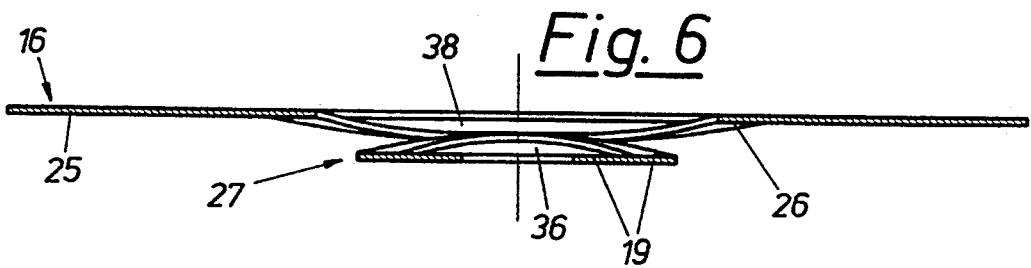
FIG. 6 is a cross sectional view along the line VI—VI in FIG. 4, wherein FIGS. 5 and 6 the rings of the shutter blade and the guides are bent up as is the case when the valve is opened, but in a condensed diagram, in order to depict better the deformations of the shutter blade.

It is clear from FIG. 1 that the shutter blade 16 according to FIG. 4 is clamped with its clamping ring 25 between the face of the cylinder 1 and the seat plate 4 of the valve assembly. The lock element 27 of the shutter blade 16 controls there the suction valve 7. While opening the suction valve 7, the shutter blade 16 can be swung out into the free space of the cylinder 1 without an end stop. FIGS. 5 and 6 depict in an axial cross section how the shutter blade 16 is deformed with the opened suction valve 7.

From FIG. 5 it can be inferred that in the swung out state not only the guides 26 are bent but also the rings 19 of the lock element 27. It can be seen from FIG. 5 that at the same time the passage slots 37 are spread apart in the shape of a diamond, so that their free passage cross section is greater than when the lock elements lie in one plane, as shown in FIG. 4. It is also apparent that the rings 19 of the lock element 27 do not run parallel to the clamping plane of the shutter blade 16, but rather are deformed diagonally to the flow direction of the medium. The same situation can also be seen in FIG. 6. There it is also evident that the passage slots 36 are also spread apart between the two concentric rings 28 of the lock element 27 and thus exhibit a larger passage cross section. On the whole, the valve according to the invention has thus a larger free passage cross section for the medium to flow through, offers it better flow conditions and, compared to the comparable known designs, is characterized, therefore, by significantly less passage resistance.

We claim:

1. A valve for controlling a flow of a fluid medium, said valve comprising a seat plate having a plurality of channels therethrough through which fluid medium can flow, and a shutter plate positioned adjacent said seat plate to open or close said channels in said seat plate and control the flow of fluid medium therethrough, said shutter plate comprising:

an outer clamping ring which is positionable against said seat plate, a guide comprising a first inner ring located within said outer clamping ring, and diametrically opposed, radially-extending first cross pieces connecting said first inner ring to said outer clamping ring, said first inner ring defining first circumferential portions which extend away from said cross pieces and opposed second circumferential portions which are offset radially outwardly relative to said first circumferential portions, and a lock means mounted within said first inner ring, said lock means comprising a second inner ring located within said first inner ring, diametrically opposed, radially-extending second cross pieces connecting said second inner ring with said second circumferential portions of said first inner ring, a third inner ring located within said second inner ring, and diametrically opposed, radially-extending third cross pieces connecting said third inner ring with said second inner ring, said third cross pieces being radially offset relative to said second radial cross pieces, said second and third inner rings being positionable against said seat plate to close corresponding channels in said seat plate or movable away from said seat plate to open said channels.

2. A valve according to claim 1, wherein said first and second cross pieces have arched lateral sides whose diameters of curvature are greater than an average radial width of said first circumferential portions of said guide.

3. A valve according to claim 1, wherein said first and second circumferential portions of said guide have about the same radial widths.

4. A valve according to claim 1, wherein said opposed second cross pieces are offset by 90° relative to said opposed first cross pieces.

5. The combination of a compressor having a cylinder portion and a head portion and a valve positioned between said cylinder portion and said head portion for controlling a flow of fluid medium therebetween, said valve comprising a seat plate having a plurality of channels therethrough through which fluid medium can flow, and a shutter plate positioned adjacent said seat plate to Open or close said channels in said seat plate and control the flow of fluid medium therethrough, said shutter plate comprising an outer clamping ring which is positionable against said seat plate, a guide comprising a first inner ring located within said outer clamping ring, and diametrically opposed, radially extending first cross pieces connecting said first inner ring to said outer clamping ring, said first inner ring defining first circumferential portions which extend away from said cross pieces and opposed second circumferential portions which are offset radially outwardly relative to said first circumferential portions, and a lock means mounted within said first inner ring, said lock means comprising a second inner ring located within said first inner ring, diametrically opposed, radially-extending second cross pieces connecting said second inner ring with said second circumferential portions of said first inner ring, a third inner ring located within said second inner ring, and diametrically opposed, radially-extending third cross pieces connecting said third inner ring with said second inner ring, said third cross pieces being radially offset relative to said second radial cross pieces, said second and third inner rings being positionable against said seat plate to close corresponding channels in said seat plate or movable away from said seat plate to open said channels.

* * * * *